(12) United States Patent
Engelhart (10) Patent No.: US 7,515,696 B2
(45) Date of Patent: Apr. 7, 2009

(54) CENTRALIZED COMMUNICATIONS NETWORK CHARGING METHODS AND APPARATUS

(75) Inventor: Robert L. Engelhart, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1439 days.

(21) Appl. No.: 10/365,116

(22) Filed: Feb. 11, 2003

(65) Prior Publication Data

US 2003/0158812 A1 Aug. 21, 2003

Related U.S. Application Data

(60) Provisional application No. 60/356,579, filed on Feb. 11, 2002.

(51) Int. Cl.
 *H04M 15/00* (2006.01)
(52) U.S. Cl. .............................. 379/114.28; 379/114.2; 379/121.03
(58) Field of Classification Search ................. 379/111, 379/114.01, 114.15, 114.17, 114.19, 114.2, 379/114.28, 121.01, 126, 127.04, 121.03
See application file for complete search history.

(56) References Cited

U.S. PATENT DOCUMENTS

| | | | |
|---|---|---|---|
| 5,960,416 A | | 9/1999 | Block |
| 6,714,539 B1 * | | 3/2004 | Sbisa .......................... 370/385 |
| 6,785,534 B2 * | | 8/2004 | Ung ............................ 455/406 |
| 6,952,575 B1 * | | 10/2005 | Countryman et al. ........ 455/408 |
| 7,155,205 B2 * | | 12/2006 | Cerami et al. ................ 455/406 |
| 2001/0000808 A1 | | 5/2001 | Lesley |
| 2002/0138378 A1 | | 9/2002 | Leskuski |
| 2002/0138427 A1 | | 9/2002 | Trivedi |
| 2003/0069840 A1 * | | 4/2003 | Ung ............................ 705/39 |
| 2003/0105864 A1 * | | 6/2003 | Mulligan et al. ............. 709/225 |
| 2003/0185363 A1 * | | 10/2003 | Cerami et al. ................ 379/126 |
| 2004/0053604 A1 * | | 3/2004 | Ratilainen et al. ......... 455/414.2 |
| 2004/0192297 A1 * | | 9/2004 | Erskine et al. ............ 455/432.1 |
| 2005/0100149 A1 * | | 5/2005 | Abbasi et al. ............. 379/114.2 |

FOREIGN PATENT DOCUMENTS

| | | | |
|---|---|---|---|
| CA | 2 350 901 A1 | 12/2001 |
| DE | 198 40 910 A1 | 3/2000 |
| EP | 1 035 723 A2 | 9/2000 |

\* cited by examiner

*Primary Examiner*—Binh K Tieu
(74) *Attorney, Agent, or Firm*—Micahel J. Donohue; Davis Wright Tremaine LLP (57) ABSTRACT

Centralized billing is provided by processing requests for pre-paid and post-paid services at a service control point that is configured to prepare one or more associated event records. Event records associated with provided services can be stored at the service control point or in a remote database, or the service control point can direct the event records to a central billing system that is configured to bill subscribers directly or to transmit event records to one or more payment systems via a financial gateway. Service control point service logic is configured to permit negative account balances for post-paid subscribers, while account balances remain positive for pre-paid subscribers. Credit limits can be associated with post-paid subscribers, and service authorization can be based on such credit limits.

24 Claims, 6 Drawing Sheets

CENTRALIZED COMMUNICATIONS NETWORK CHARGING METHODS AND APPARATUS

CROSS REFERENCE TO RELATED APPLICATIONS

This application claims the benefit of Provisional Application No. 60/356,579, filed Feb. 11, 2002.

TECHNICAL FIELD

The disclosure pertains to methods and apparatus for billing communication network subscribers for services.

BACKGROUND

A variety of communication networks have been developed for analog and digital communication of voice and data. New wireless network configurations continue to be rapidly introduced, so that most service providers maintain and operate networks and network components based on several communication standards or protocols. By adding new network services or introducing new services based on additional standards to existing networks, service providers can continue to serve existing subscribers without service interruptions while supplementing service offerings.

While this network evolution offers substantial advantages to both network operators and network subscribers, there are several disadvantages to such evolution. First, network operators must continue to maintain, install, and support network elements based on a variety of standards. In addition, network operators must devote considerable effort to configuring network elements based on this variety of standards. Configuring a network to add service can be complex, requiring modification of many network elements. Supporting multi-standard networks can be especially difficult.

While network evolution can offer enhanced or new services, access to such services must be convenient for subscribers. Network access, authorization, and billing processes frequently present obstacles to the use of new or enhanced communication services. Enhanced or new services that require users to undergo even a brief authorization or re-authorization process can remain underused as subscribers may perceive the authorization process as unacceptably unwieldy. In addition, users may elect to use services offered by a variety of service providers, and selected service providers must be able to appropriately bill users for services. Typically user access to communication service providers is based on user account and billing information specific to each service provider, and access to multiple service providers is awkward. In view of these difficulties, improved communication systems and methods are needed.

SUMMARY

Service control points comprise a service request input configured to receive service data associated with communication service requests associated with pre-paid communication services and post-paid communication services. Service logic is configured to receive the service data and produce associated event records, and an output is configured to transmit the event records. In some examples, a memory is configured to store the event records. In other representative examples, the communication service requests are associated with a first and a second communication standard. A first pre-processor and a second pre-processor are configured to pre-process the service data based on the first communication standard and the second communication standard, respectively, and deliver the pre-processed service data to the service logic. In additional representative examples, the output is configured to transmit a selected event record upon completion of the selected event record. In other examples, an event request input is configured to receive a request for transmission of event records. In further representative examples, the communication service requests are received from at least a first network and a second network, wherein the first network and the second network are associated with different service providers. In other examples, the service logic is configured to authorize a communication service associated with a pre-paid subscriber based on a pre-paid subscriber account balance or a post-paid subscriber based on a subscriber credit limit, respectively.

Mediation systems for distributing communication event records comprise a memory configured to retain a plurality of event records associated with communication service requests. A processor is configured to determine if an event record is associated with pre-paid service or post-paid service, and to deliver event records associated with post-paid service to at least one billing system. In additional examples, the event records are associated with communication service requests associated with at least two service providers. In other examples, the event records are associated with communications service requests associated with at least two communication standards. In other examples, the processor is configured to direct at least some event records associated with subscribers of different service providers to a single billing system.

Methods of producing event records associated with requests for communication services by a subscriber comprise collecting communication service request data associated with the requests for communication services at a centralized record production point, wherein the requests are associated with pre-paid services and post-paid services. Event records associated with the communication service requests are produced; wherein the event records are configured to indicate whether a communication service request is associated with pre-paid service or post-paid service. In some examples, the event records are associated with services configured based on different communication standards. In other examples, the subscriber is billed based on event records directed to at least one billing service and the billing service is a credit card service or a debit service, and a user account is recharged directly by the credit card service or the debit service. In other examples, the event records produced by the centralized charging point are associated with subscribers to networks associated with different service providers.

Billing methods for communication services comprise collecting event data associated with communication service requests associated with a pre-paid and post-paid services at a central collection node. Event records are produced based on the request data, and the event records associated with post-paid services are delivered to a billing system. In other examples, event records are directed to at least two billing systems.

Computer-readable medium having stored thereon event records in a data structure comprising a first data field configured to represent a provided communication service. A second data field is configured to contain data associated with a subscriber payment type, wherein the subscriber payment type is associated with services that are provided as pre-paid services or post-paid services.

Methods of configuring communication services billings comprise collecting event records associated with the communication services provided by a plurality of service providers to pre-paid subscribers and post-paid subscribers at a central collection node. Selected event records are transmitted to at least one billing system. In other examples, the event records are delivered to an event mediator, wherein the event mediator directs selected records to the billing system. In some representative examples, the billing system is a credit card system.

Communication systems comprise an input configured to receive a service authorization request associated with a request for services by a subscriber. Service logic is configured to determine a subscriber account type and produce a service authorization based on the subscriber type. In representative examples, the service logic is configured to authorize a requested service if the subscriber type is pre-paid and a subscriber account balance is positive.

Methods for processing service requests by pre-paid and post-paid subscribers of communication services comprise determining if a service request is associated with a pre-paid subscriber or a post-paid subscriber. If the request for services is associated with a pre-paid subscriber, the requested service is authorized based on a subscriber account balance that is greater than zero. Charges for the requested service are assessed to the subscriber account balance so that the subscriber account balance is greater than zero for a pre-paid subscriber and less than zero for a post-paid subscriber. In additional examples, a service reauthorization for a post-paid subscriber is based on a subscriber account balance and a subscriber credit limit. In other examples, a service reauthorization for a pre-paid subscriber is provided based on a subscriber account balance.

These and other features and advantages are described below with reference to the accompanying drawings.

DETAILED DESCRIPTION

Figure 1A:
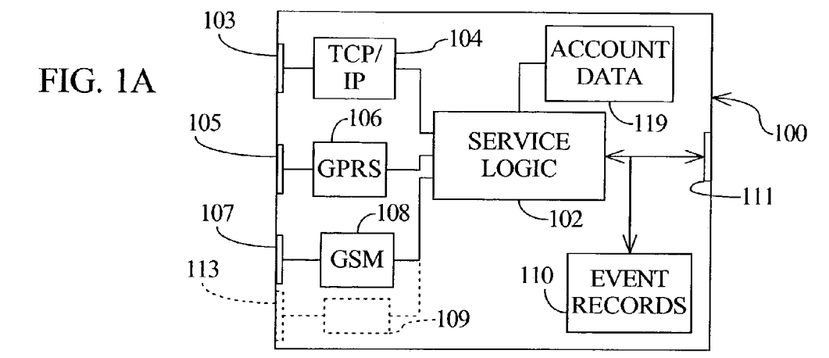
FIG. 1A is a schematic diagram of a service control point (SCP).

With reference to FIG. 1A, a service control point (SCP) 100 includes service logic 102 that is configured to receive data concerning communication services requested or provided to one or more subscribers at inputs 103, 105, 107. The SCP is typically implemented as a server or other processing system and communication service request data can be received from various network nodes such as a Mobile Switching Center (MSC), a Serving General Packet Radio Support Node (SGSN), a Gateway General Packet Radio Services Support Node (GGSN), other service control points, or other network nodes. The SCP 100 can include one or more network-specific pre-processors such as pre-processors 104, 106, 108 that are configured to receive communication services such as Transmission Control Protocol/Internet Protocol (TCP/IP) services, General Packet Radio Services (GPRS) data services, or Global System for Mobile Communications (GSM) voice or messaging services, respectively. Pre-processors can be configured for services and networks based on other standards such as, for example, digital AMPS (D-AMPS), IS-136, IS-95, a public switched telephone network (PSTN), or provided for customized networks. In addition, pre-processors can be configured to provide data for other services and transactions, including services other than communication services.

Pre-processors such as the pre-processors 104, 106, 108 are generally configured based on a signaling or messaging protocol associated with a selected network. Representative examples of such protocols include those based on ITU-T Q. 1218 Interface Recommendation for Intelligent Network CS-1, TCP/IP, Wireless Intelligent Network (WIN), Advanced Intelligent Network (AIN), and Customized Applications for Mobile Network Enhanced Logic (CAMEL). The service logic 102 receives the pre-processed communication service data, and produces one or more event records that can be stored in a memory 110. Requests for services are typically provided based on subscriber account data stored in an account database 119. Services provided can include pre-paid services, post-paid services, 4-digit dialing, and other services. Stored event records can be transmitted to one or more billing systems via an SCP output 111 as event records are created, or event records can be accumulated for later transmission.

New services can be accommodated by providing a corresponding pre-processor to the SCP 100. Billing for new services or services based on additional standards can be provided using event records obtained using the newly added pre-processor. For example, additional hardware associated with an additional pre-processor can be situated at a pre-processor slot 109 provided for expansion or reconfiguration of the SCP 100. In some examples, computer-executable instructions associated with supported services, newly added services, or services based on newly added standards can be provided for the service logic 102 or included or partially included with a respective pre-processor. The SCP 100 can include memory or other storage for such instructions. The pre-processors can also include memory. Memory for storage of event records and processor instructions can be provided as random access memory (RAM), a hard disk, a floppy disc, or other computer readable media.

The SCP 100 can be configured to control various services such as, for example, pre-paid voice services, GPRS data services, toll-free calling, hotline services, or emergency location services. Typically the availability of a service to a particular user is determined using subscriber data stored in the account database 119. Event records can be provided for a variety of services such as those listed above as well as services such as, GSM voice calls, voice over IP, GSM short message services, and data services such as circuit switched or packet switched data transmission. Event data records can also be produced for services and transactions other than communication services.

The SCP 100 of FIG. 1 can be implemented as a logical unit which has distributed, interconnected portions. For example, service logic 102 can be situated at a first location, and memory associated with event record storage or subscriber account data can be remotely located at one or more other locations.

Figure 1B:
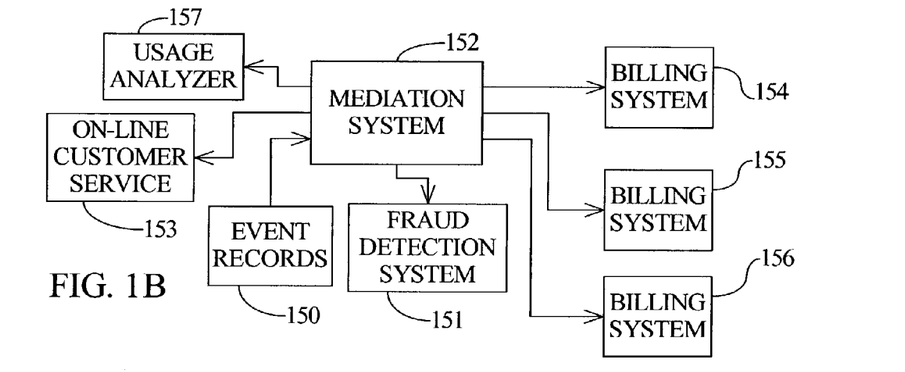
FIG. 1B is a schematic diagram illustrating distribution of event records.

With reference to FIG. 1B, a mediation system 152 is configured to direct event records stored in a memory 150 to one or more billing systems 154, 155, 156. The mediation system 152 can be configured to direct event records to a billing system based on event record contents such as a service provider identification or a subscriber identification. In some examples, the mediation system is configured so that event records associated with pre-paid services are not directed to an additional billing system as charges associated with such services are deducted from a subscriber's current account balance in an account database at a service control point. In some examples, the mediation system 152 transmits event records in response to a request for event records or periodically. The mediation system 152 can also be configured to process event records prior to transmission based on, for example, data preferences or other preferences associated with a selected billing system. Event records can also be selected for delivery to a fraud detection system 151, an on-line customer service center 153, or a usage analyzer 157. The on-line customer service center 153 can be configured so that a network subscriber can review some or all event records associated with services requested by the network subscriber.

Figure 1C:
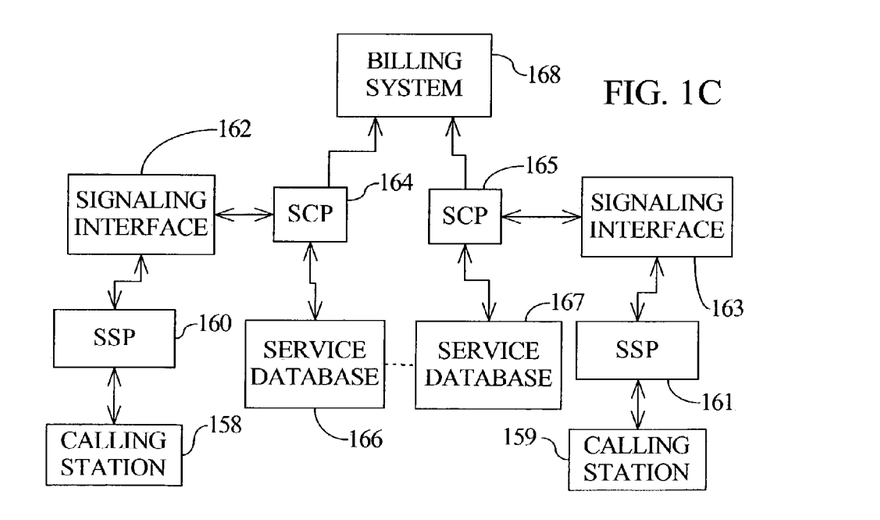
FIG. 1C is a schematic diagram of a communication system in which service requests are received from one or more calling stations.

With reference to FIG. 1C, one or more calling stations 158, 159 are in communication with respective service switching points (SSPs) 160, 161. Calling stations can include fixed or mobile telephones, desktop computers, laptop computers, portable digital assistants, handheld computers, pagers, and other devices. Signaling interfaces 162, 163 connect the SSPs 160, 161 with respective service control points (SCPs) 164, 165 that are configured to query one or more service databases such as the service databases 166, 167, respectively, for services associated with a particular calling station. The service database 166 is configured to return a query response based on available services to the SCPs 164, 165, and the SSPs 160, 161 are configured based on the available services.

A billing system 168 is in communication with the SCPs 164, 165 and can be configured to receive event records associated with communication services controlled by or requested from the SCPs 164, 165. The billing system 168 can be configured to invoice post-paid subscribers for services provided or requested based on the event records.

Figure 2:
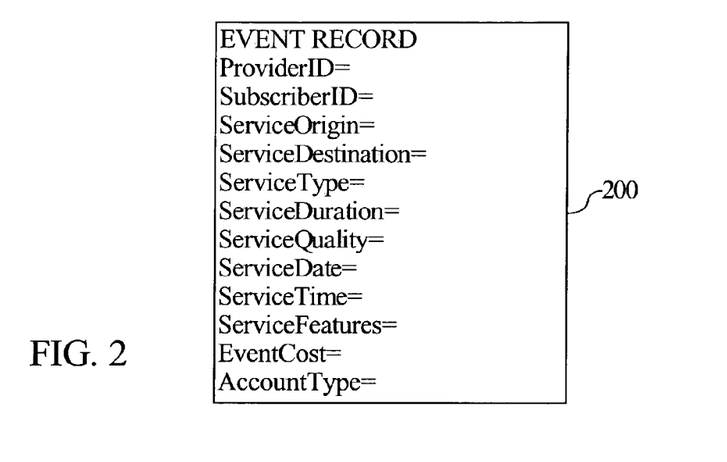
FIG. 2 is a representation of an event record.

A representative event record 200 is illustrated in FIG. 2. The event record 200 can be configured to include a variety of data fields associated with, for example, service identifiers, subscriber identifiers, service providers, equipment identifiers, types of service, service durations, dates and times of service requests, completion indicators, service quality, and service features. Typically the event record 200 is configured based on billing requirements of service providers or requirements of network analysis systems. Event records typically include a data item associated with an EventCost that can be used by a billing system to assess charges to a subscriber and a value associated with ServiceType that associates a service with a post-paid account. Alternatively, event records can be configured to permit determination of service charges associated with events by the billing system or otherwise determined. For convenience, event records can be provided in a standard format, or can be configured to include data fields associated with a standard set of data fields. Event records associated with services provided by a selected service provider to one or more subscribers can be collected, or services provided to a single user by one or more service providers can be collected. Collection and forwarding can typically be controlled using a mediation system as illustrated in FIG. 1B.

Event records can also include identifiers associated with a mobile subscriber ISDN (MSISDN), an international mobile subscriber identifier (IMSI), or other equipment identifier or subscriber identifier. In some examples, equipment identifiers include an international mobile equipment identity (IMEI) so that event records associated with a selected communication device can be selected. One or more equipment and/or subscriber identifiers can be included in an event record to verify service authorization. In some examples, event records for services other than typical mobile or fixed communication services can be produced by an SCP. For example, a preprocessor can be configured to produce event records associated with online or other purchases to be billed using a central payment system.

Figure 3:
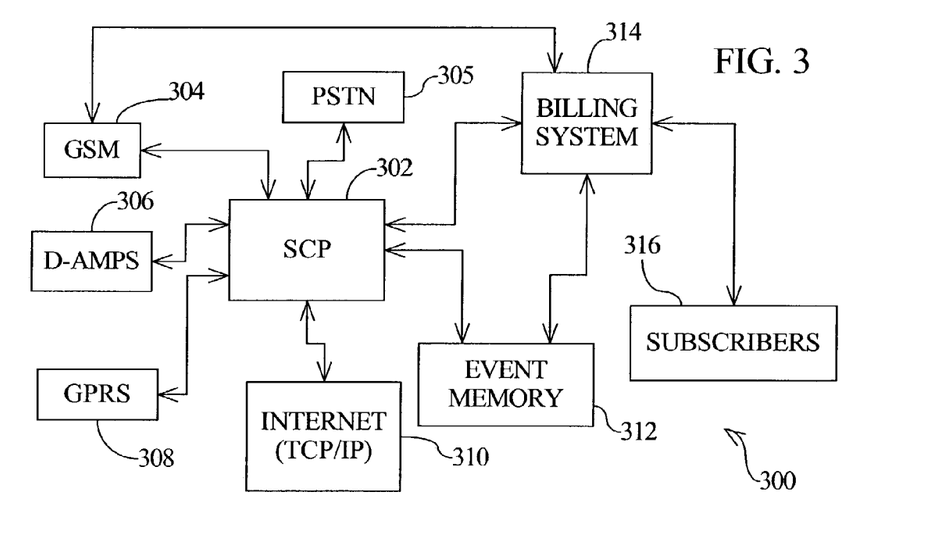
FIG. 3 is a schematic diagram of a communication system that includes one or more communication networks and a centralized billing system.

FIG. 3 is a schematic diagram of a communication system 300 configured to use centralized event capture using a service control point (SCP) 302. The SCP 302 is configured to receive and process communication service data associated with communication service requests received from one or more communication networks, such as, for example, a GSM-based network 304, a public switched telephone network (PSTN) 305, a digital AMPS network 306, a GPRS network 308, and an Internet access service 310. The SCP 302 is configured to produce associated event records that can be assembled at the SCP 302 and stored in an event memory 312 that can be located at or in the SCP 302, or can be located remotely. The SCP 302 can be configured to return an event record to an appropriate network after the event record is assembled, or event records can be accumulated so that multiple event records are returned together. In addition, the SCP 302 can be configured to produce event records associated with pre-paid and post-paid services. Typically, event records are directed to a billing system 314 that produces invoices for one more subscribers 316 for services based on the appropriate event records. Event records can be associated with one or more services or service providers, and directed to one or more billing systems.

Figure 4:
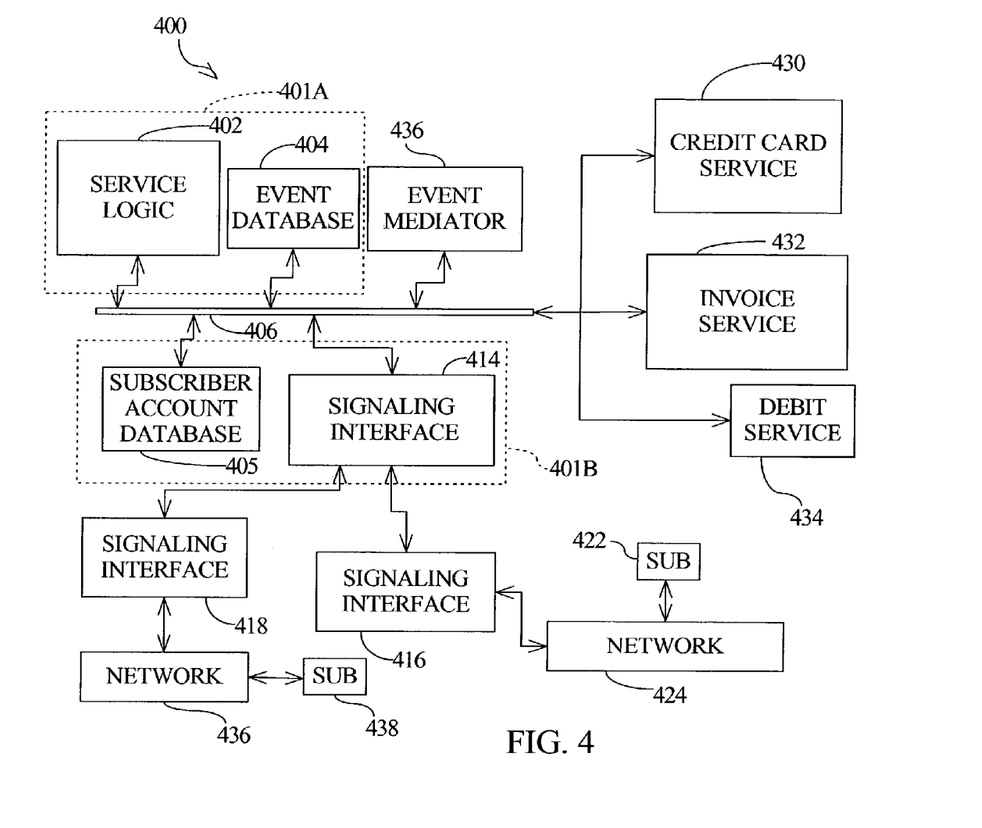
FIG. 4 is a block diagram of a communication system configured to deliver event records to one or more billing systems.

FIG. 4 is a schematic block diagram illustrating a communication system 400 that includes service logic 402 and a memory 404 that communicate using an interface bus 406 that is in communication with a signaling interface 414. Signaling interfaces 416, 418 are configured to receive signaling data associated with requests for communication or other services from subscribers 422, 438 of respective networks 424, 436 and communicate with the signaling interface 414. The signaling interfaces 416, 418 can be configured based on SS7 or other signaling protocols. The subscriber 422 of the network 424 requests a communication service by, for example, placing a voice call, sending a short message service (SMS) message or an email, or retrieving or depositing voicemail. The network 424 can be a fixed network, a mobile network, or other network configuration. As shown in FIG. 4, the network 424 directs service request data associated with, for example, a call request by the subscriber 422, to the signaling interface 416. The service request data is processed by the service logic 402 an associated event record is delivered to an event database at the memory 404.

The service request data can include network identification, call origin, call destination, call time, type of communication, duration of communication, and other service-related information. The service logic is in communication with a subscriber database stored in a memory 405 to determine services available to a selected subscriber, a subscriber balance, and a subscriber credit limit, and to determine if a requested service is a post-paid service or a pre-paid service. For pre-paid services, the service logic determines if a subscriber account balance is sufficient based on the requested service. For post-paid services, the service logic 402 can evaluate a subscriber credit limit, or authorize services without determining the subscriber credit limit.

The service logic 402 is in communication with an event mediator 436 that directs event records to, for example, a credit card service 430, an invoice service 432, or a debit service 434. The network 424 can include service logic, or such service logic can be external to the network 424 as shown in FIG. 4. The service logic 402 can also be configured to request, authorize, or trigger payment using the credit card service 430, the invoice service 432, or the debit service 434, or other payment service. For example, the credit card service 430 can be configured to receive service billing data (event records) so that service charges are added to a credit card billing record associated with the subscriber 422. The SCP can be directly connected to a credit service or a debit service using, for example, a XML over HTTP or Common Object Request Broler Architecture (CORBA). The credit card service 430 can return a billing authorization or confirmation, or other notification so that a subscriber account balance is recharged. The invoice service 432 can be configured so that, for example, itemized invoices for services can be provided directly to the subscriber 422 for payment. In another alternative, event records can be provided to a debit service 434 So that a subscriber account is assessed directly. Upon billing for services, receipt of payment, or addition of funds to a pre-paid account balance, a subscriber account balance be revised. The service logic 402 can assess pre-paid charges to pre-paid account balances or postpaid charges to post-paid account balances stored in the subscriber account database, and the event mediator 436 configured so that events associated with pre-paid services are not directed to a billing system. The service logic 402 can be configured to determine that a subscriber has exceeded an available account balance or credit limit so that a service request is denied or a subscriber is directed to a system configured to permit recharging the subscriber account balance. Event records can be accumulated for transmission in groups, or individual event records can be transmitted when complete and subscriber account balances and total charges can be monitored. For post-paid subscribers, negative account balances can be permitted, and a credit limit can be associated with a negative account balance having a magnitude that is not to be exceeded.

The network 436 that is accessed by the second subscriber 438 is also in communication via the communication bus 406. Typically a communication system can be configured so that event records associated with communication requests of multiple subscribers or system users of one or more networks are produced and/or stored. Such communication requests can be based on voice calls that are completed or directed to voice mail, SMS messages, data transfers, or other communications. The service logic 402 can associate selected types of communications with associated payment providers. Thus, payments for different communication types or using different networks can be authorized or provided using different payment services. Payment providers for various service providers and types of service can be configured in a subscriber billing profile that can be stored at, for example, the memory 404 or stored elsewhere. Alternatively, the service logic 402 can produce one or more event records that are transmitted directly to appropriate billing systems, and event records can be associated with both pre-paid and post-paid services.

As shown in FIG. 4, event records are produced by a logical processor that includes distributed portions 401A, 401B. In other examples, such functional units can be co-located, or can be separate and configured to communicate via one or more additional networks or communication buses.

Figure 5:
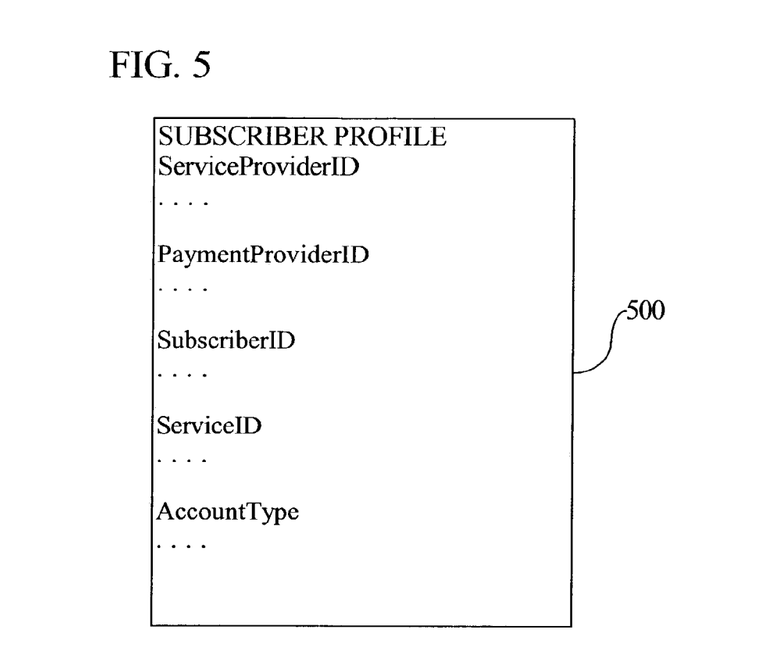
FIG. 5 is a schematic diagram of a subscriber billing profile.

FIG. 5 is a schematic diagram of a subscriber profile 500 that can be used in conjunction with event records. The subscriber profile 500 includes fields configured to retain identifiers associated with one or more service providers (ServiceProviderID) and one or more payment providers (PaymentProviderID). The subscriber profile 500 can also include a ServiceType field that indicates if one or more services are to be billed as pre-paid services or post-paid services. For example, a user can subscribe to several communication services such as wireless communication networks, and can elect payment via a debit system, a credit card system, or other payment mechanisms associated with one or more financial institutions. In addition, services can be identified for billing in a selected manner via a selected financial institution. For example, SMS message services can be selected for billing via a credit card service while voice calls are billed using an invoice service. In other examples, work-related communication services associated with, for example, a particular service provider, can be directed to different billing service than personal communication services. Subscriber profiles can be arranged based on such billing preferences.

Figure 6:
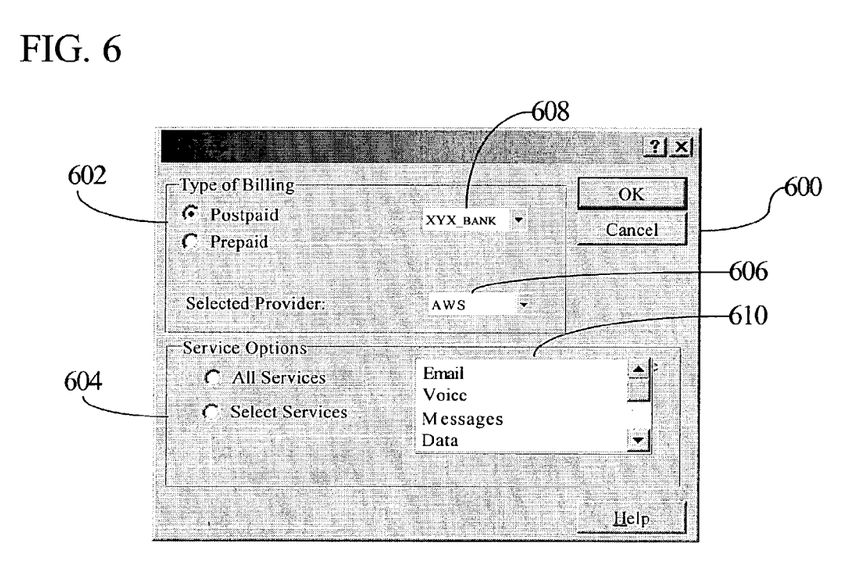
FIG. 6 is a schematic diagram of a portion of a display associated with a user interface for configuring a subscriber billing profile.

With reference to FIG. 6, a portion 600 of a user interface for display and entry of parameters associated with a subscriber billing profile includes a billing type field 602 that is used to select a billing type such as pre-paid or post-paid. The subscriber billing profile can also be based on subscriber selections concerning billing methods such as credit card payment or invoicing. A financial institution field 608 can be used to select an appropriate financial institution associated with services provided by one or more service providers that are selected using a service provider field 606. Billing for all or selected services provided by a service provider can be similarly billed, or services can be selected for different billing types using a service options field 604. A menu of services can be selected from the scrollable field 610. Typically, the user interface is configured so that available selections are displayed, and unavailable selections are either not displayed or displayed to indicate that such selections, while generally available, are not currently available.

Figure 7:
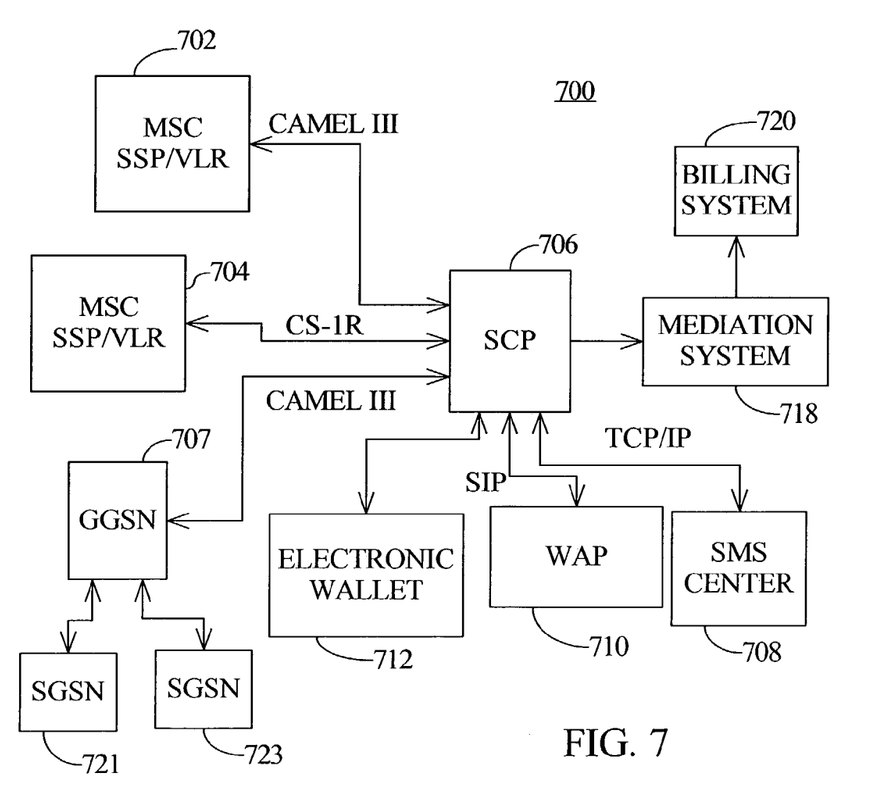
FIG. 7 is a schematic diagram of a communication system that includes a service control point.

With reference to FIG. 7, a communication system 700 includes Mobile Switching Centers (MSCs) 702, 704 that are in communication with a centralized service node 706 using, for example, a CS-1R protocol, an AIN protocol, or other signaling protocol. A General Packet Radio Service (GPRS) Gateway Support Node (GGSN) 707 is in communication with the centralized service node 706 using a CAMEL III or other protocol. Additional communication services are provided based on a Short Message Service (SMS) center 708 and a Wireless Application Protocol (WAP) center 710 that are in communication with the centralized service node 706 using, for example, TCP/IP protocol and Session Initiation Protocol (SIP), respectively. An electronic wallet service center 712 is also in communication with the centralized service node 706.

The centralized service node 706 is configured to provide communication services such as, for example, pre-paid services, post-paid services, and other services and produce event records associated with such services. The event records are directed by a mediation system 718 to one or more billing systems such as a representative billing system 720. Various portions of the communication system 700 can have a common owner, or different portions can have different owners. For example, the MSCs 702, 704 can be associated with different service providers, and the centralized service node 706 can be owned by one or these service providers, or by someone else. The billing system 720 can be commonly owned with an MSC or other network node, or billing services can be provided by another communication services provider, a financial services provider, or other provider.

Figure 8A:
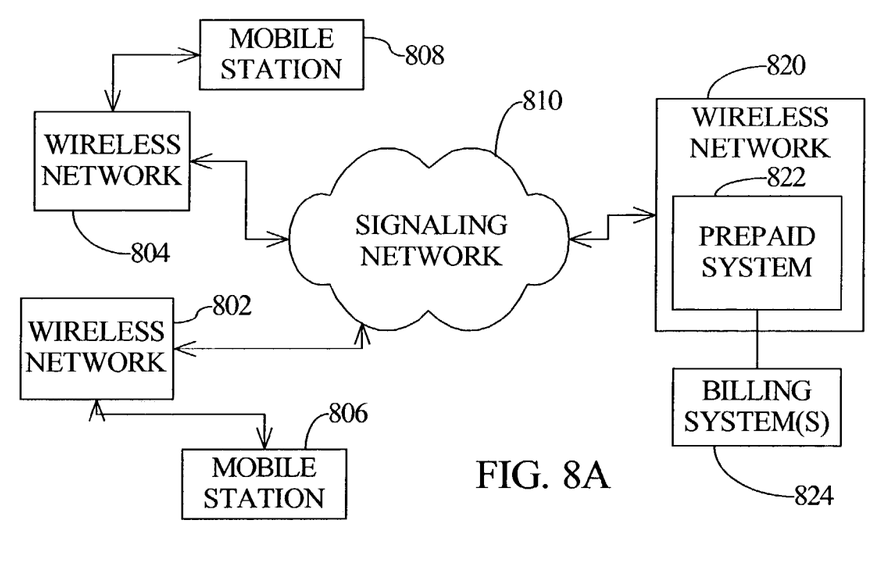
FIGS. 8A-8B are schematic diagrams of communication systems that provide post-paid subscriber billing based on a pre-paid billing system.

With reference to FIG. 8A, wireless networks 802, 804, 820 or other communication networks are in communication with a signaling network 810. Mobile stations 806, 808 are configured to receive services that are accessed via the wireless networks 802, 804, respectively. Billing for services provided to the mobile stations 806, 808 can be provided based on a pre-paid billing system 822 that is included in the wireless network 820. The pre-paid billing system 822 can be configured to receive a request to authorize services requested by one or both of the mobile stations 806, 808, and return an authorization indication and an instruction to request reauthorization after a selected time interval. For example, a pre-paid voice call can be authorized for a certain duration after which re-authorization is to be requested. Thus, services can be provided only to a subscriber having a positive account balance. The pre-paid billing system can also be configured to authorize services without requesting or requiring re-authorization. Such authorization does not require a particular account balance, and for subscribers using post-paid services, negative account balances can be acceptable. A payment system 824 can be used to bill post-paid services based on event records produced or stored at the pre-paid billing system 822 or elsewhere.

Figure 8B:
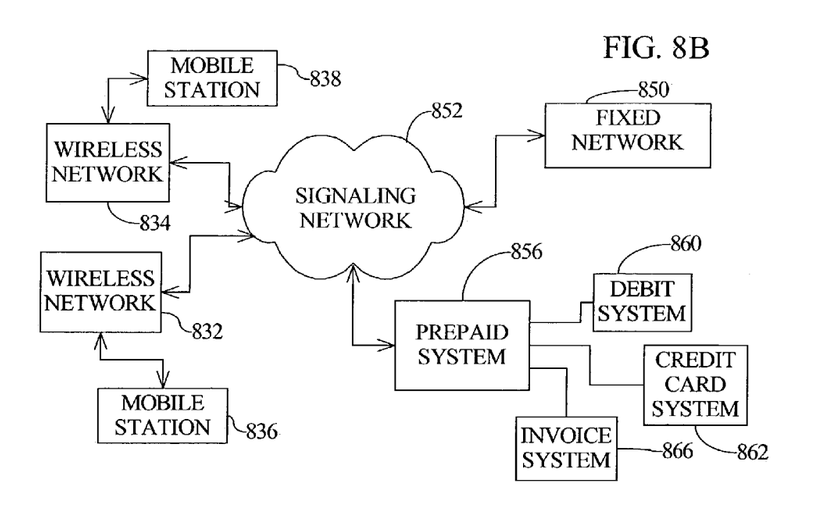

With reference to FIG. 8B, wireless networks 832, 834 are configured to provide services to mobile stations 836, 838, respectively. The wireless networks 832, 834 and a fixed network 850 are in communication with a pre-paid billing system 856 via a signaling network 852. The pre-paid system 856 is configured to bill subscribers for services by directly interfacing to, for example, a debit system 860, a credit card system 862, or an invoice system 866 in addition to providing authorization for pre-paid services.

Figure 8C:
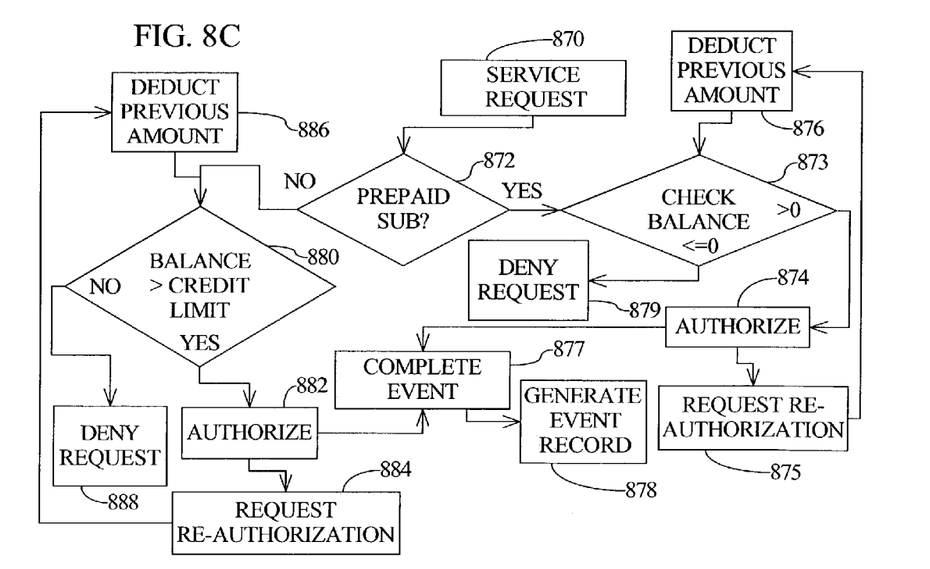
FIG. 8C is a block diagram illustrating processing of pre-paid and post-paid service requests with a pre-paid billing system.

Service request handling by a pre-paid system is illustrated in FIG. 8C. A service request is received in a step 870. In a step 872, the service request 870 is associated with request for pre-paid services or a request for post-paid services. If the service request 870 is associated with pre-paid services, then a subscriber account balance is checked in a step 873. If the account balance is greater than zero, then services are authorized in step 874. Service re-authorization can be requested in a step 875 so that the subscriber account balance is not exceeded. Charges for previously provided services are assessed to the subscriber account balance in a step 876, and the subscriber account balanced is again checked for authorization in the step 873. Upon service completion in a step 877, an event record is generated in a step 878. If the subscriber account balance is insufficient, requested services are denied in a step 879. Alternatively, if the subscriber account balance is inadequate, the subscriber can be directed to an announcement that requests that the subscriber recharge the account balance and instructs the subscriber concerning recharging procedures.

A request for post-paid services is directed to a step 880 in which a subscriber account balance is compared with a subscriber credit limit. In some examples, at least some post-paid subscribers do not have credit limits, and services are authorized without review of a credit limit or an account balance. If the service request 870 is associated with a request for post-paid services, a pre-paid charging system is instructed to permit negative account balances. For service requests associated with appropriate credit limits and account balances, services are authorized in a step 882. Re-authorization can be requested in a step 884 so that charges do not exceed credit limits. Service charges for previously provided services are assessed to the post-paid subscriber account balance in a step 886. Service is re-authorized based on checking the subscriber account balance and credit limit again in the step 880. If the subscriber account balance and/or credit limit are inadequate, the service request is denied in a step 888, or the subscriber is directed to a recharging system. In some examples, assessed charges are based on a service duration that can only be obtained upon service completion, and final charges are assessed to subscriber account balances in the step 877.

Modified pre-paid billing systems can be configured to process billings for services provided by a plurality of service providers, or provided based on one or more network standards. In addition, a modified pre-paid billing system that is part of a first network can be arranged to process billings for external networks.

It will be apparent to those skilled in the art that the examples described above can be modified in arrangement and detail. I claim all that is encompassed by the appended claims.

I claim:

1. A service control point, comprising:
   a service request input configured to receive service data associated with communication service requests associated with pre-paid communication services and post-paid communication services;
   service logic configured to receive the service data and assess charges to subscriber accounts associated with the communication service requests; and
   a memory configured to store event records associated with the pre-paid communication services and post-paid communication services.

2. The service control point of claim 1, wherein the communication service requests are associated with a first and a second communication standard, and further comprising a respective first pre-processor and a second pre-processor configured to pre-process the service data based on the first communication standard and the second communication standard, respectively, and deliver the preprocessed service data to the service logic.

3. The service control point of claim 1, wherein the service logic is configured to produce event records associated with the communication service requests.

4. The service control point of claim 1, wherein the service logic is configured to authorize a communication service associated with a prepaid subscriber based on a pre-paid subscriber account balance.

5. The service control point of claim 1, wherein the service logic is configured to authorize a communication service associated with a post-paid subscriber based on a post-paid subscriber credit limit.

6. A mediation system for distributing communication event records, the mediation system comprising:
   an input configured to receive event records associated with communication service requests, wherein the event records are associated with communication service requests associated with at least two service providers; and
   a processor configured to determine if an event record is associated with pre-paid service or post-paid service, the processor configured to deliver event records associated with post-paid service to at least one billing system, the processor configured to not deliver event records associated with pre-paid service to any billing system.

7. The mediation system of claim 6, wherein the event records are associated with communications service requests associated with at least two communication standards.

8. The mediation system of claim 7, wherein the event records are associated with communications service requests associated with at least two service providers.

9. The mediation system of claim 6, wherein the processor is configured to deliver event records associated with a selected user to a single billing system.

10. A method of producing event records associated with requests for communication services by a subscriber, comprising:
 collecting communication service request data associated with the requests for communication services at a centralized record production point, wherein the requests are associated with pre-paid services and post-paid services;
 producing event records at a service control node, the event records associated with the communication service requests, wherein the event records are configured to indicate whether a communication service request is associated with pre-paid service or post-paid service; and
 storing the event records produced to a memory in the service control node.

11. The method of claim 10, wherein the event records are associated with services configured based on different communication standards.

12. The method of claim 10, wherein the subscriber is billed based on event records directed to at least one billing service.

13. The method of claim 12, wherein the at least one billing service is a credit card service or a debit service.

14. The method of claim 10, wherein the event records produced by the centralized charging point are associated with subscribers to networks associated with different service providers.

15. A billing method for communication services, comprising:
 collecting event data associated with communication service requests associated with a pre-paid and post-paid services at a central collection node;
 producing event records at a service control node based on the request data;
 storing the event records produced to a memory in the service control node; and
 delivering event records associated with post-paid services to a billing system.

16. The billing method of claim 15, further comprising directing event records to at least two billing systems.

17. A method of configuring communication services billings, comprising:
 collecting event records associated with the communication services provided by a plurality of service providers to pre-paid subscribers and post-paid subscribers at a service control node;
 storing the event records collected in a memory in the service control node; and
 transmitting selected event records to at least one billing system.

18. The method of claim 17, further comprising delivering event records to an event mediator, wherein the event mediator directs selected records to the billing system.

19. The method of claim 18, wherein the billing system is a credit card system.

20. The method of claim 18, further comprising assessing charges associated with post-paid and pre-paid subscribers to subscriber accounts associated with the service control node.

21. The method of claim 18, further comprising establishing a credit limit for a post-paid subscriber as a negative account balance.

22. A service control point, comprising:
 an input configured to receive a service authorization request associated with a request for services by a subscriber;
 service logic configured to determine a subscriber account type and produce a service authorization based on the subscriber type, wherein the service logic is configured to authorize a requested service if the subscriber type is pre-paid and a subscriber account balance is positive, wherein the service logic is configured to authorize a requested service if the subscriber type is post-paid and a subscriber credit limit has not been exceeded; and
 a memory to store event records associated with the service authorization request communication services.

23. The service control point of claim 22, wherein the service logic is configured to assess charges for a communication service to a subscriber account.

24. The service control point of claim 22, wherein the service logic is configured to associate a negative account balance with a post-paid subscriber.

* * * * *